United States Patent
Leiter et al.

(10) Patent No.: US 6,255,605 B1
(45) Date of Patent: *Jul. 3, 2001

(54) WINDSCREEN WIPER DRIVE DEVICE WITH A PARK POSITION SWITCH

(75) Inventors: Heinz Leiter, Gemmrigheim; Dieter Losch, Igersheim, both of (DE)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,799
(22) PCT Filed: Mar. 12, 1997
(86) PCT No.: PCT/EP97/01238
§ 371 Date: Oct. 13, 1998
§ 102(e) Date: Oct. 13, 1998
(87) PCT Pub. No.: WO97/33779
PCT Pub. Date: Sep. 18, 1997

(30) Foreign Application Priority Data

Mar. 14, 1996 (DE) .............................. 196 09 973

(51) Int. Cl.⁷ .................................................. H01H 19/00
(52) U.S. Cl. ............................................ 200/19.2; 200/24
(58) Field of Search ................................. 200/6 R, 11 R, 200/11 A, 11 G, 19.2, 19.21, 19.23, 19.24, 27 R, 28, 38 R

(56) References Cited

U.S. PATENT DOCUMENTS

| | | | |
|---|---|---|---|
| 4,259,624 | 3/1981 | Seibicke | 318/282 |
| 4,609,794 * | 9/1986 | Porter | 200/24 |
| 4,700,026 | 10/1987 | Kamiyama et al. | 200/19 R |
| 5,068,500 * | 11/1991 | Kitada | 200/19 R |
| 5,147,989 * | 9/1992 | Ito | 200/11 R |
| 5,422,449 * | 6/1995 | Kano et al. | 200/19 R |

FOREIGN PATENT DOCUMENTS

| | | | |
|---|---|---|---|
| 1061641 | 11/1956 | (DE) | . |
| 2026548 | 12/1971 | (DE) | B60S/1/46 |
| 7145933 | 12/1971 | (DE) | H01H/1/20 |
| 2621370 | 12/1977 | (DE) | B60S/1/02 |
| 3440764 | 5/1986 | (DE) | H01H/25/04 |

OTHER PUBLICATIONS

German Search Report dated Aug. 29, 1996.
PCT International Search Report dated Jun. 27, 1997.

* cited by examiner

Primary Examiner—Michael Friedhofer
(74) Attorney, Agent, or Firm—J. Gordon Lewis

(57) ABSTRACT

A driving mechanism for a windscreen wiper having a park position switch. The park position switch includes a swivable contact bridge which is pivotally arranged on a pin in the bottom of the driving mechanism. A contact tag on the contact bridge is made of an electrically conductive plate, with the contact tags being formed by bends. The contact bridge is operated via cams on the worm-gear. The cams cooperate with switch flaps on the contact bridge that are equally formed by bends. Preferably, the switch is mounted in the bottom of the driving mechanism so that the contact banks to be contacted can also extend in the bottom of the case.

14 Claims, 1 Drawing Sheet

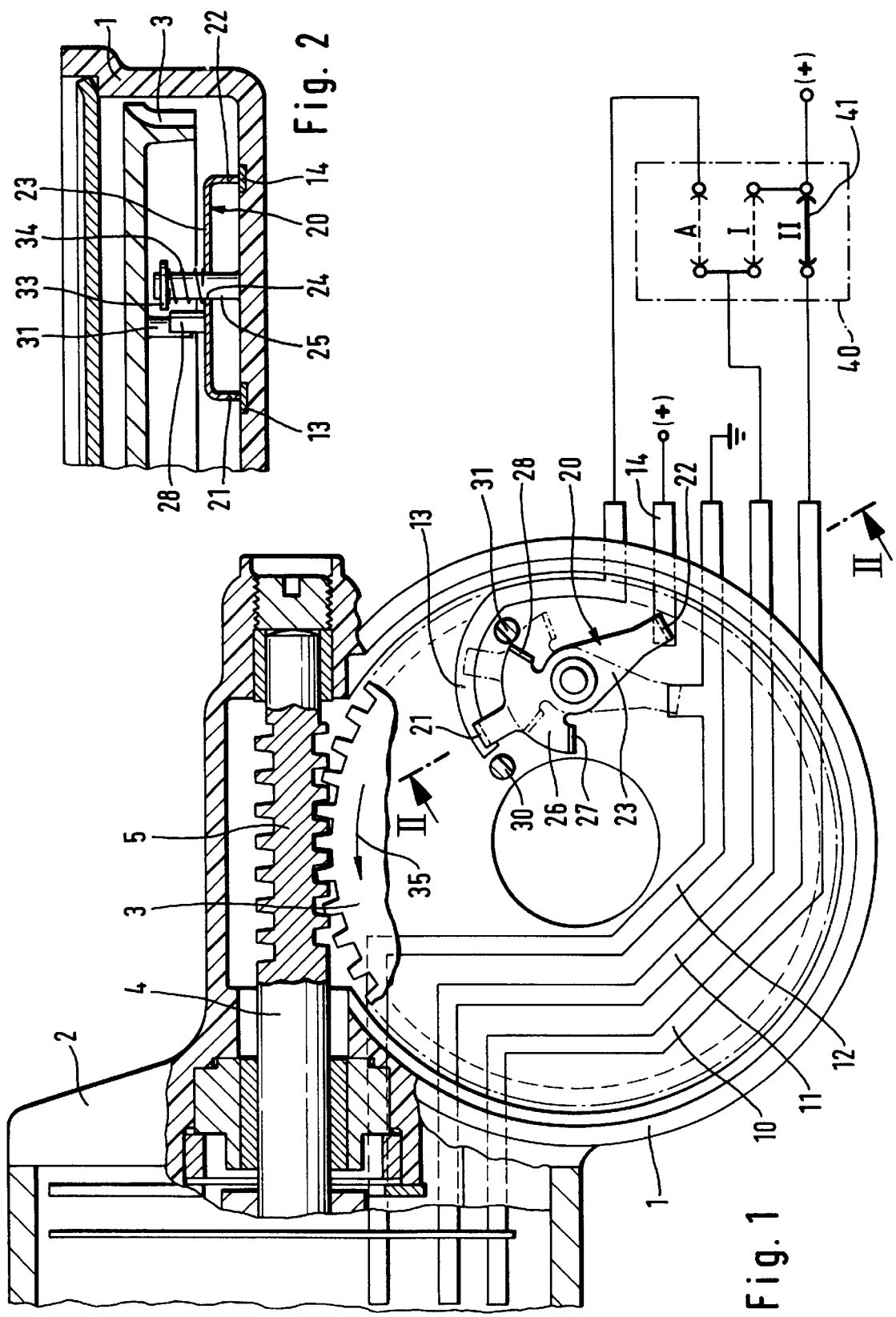

WINDSCREEN WIPER DRIVE DEVICE WITH A PARK POSITION SWITCH

BACKGROUND OF THE INVENTION

Field of the Invention

The present invention is concerned with a driving mechanism for windscreen wipers having a park position switch.

A driving mechanism of the afore-mentioned type has been described in EP 398630 A2. The contact bridge is shown to be an element displaceable within the lid of the gear box, which, by means of cams provided on the worm-wheel, can be reciprocated between two positions. To that effect, the contact bridge comprises a web guided in a corresponding slot. In the prior art arrangement, it is difficult to lock the contact bridge against dropping. Also, problems are encountered in generating a corresponding bias to place the contact bridge in adequate contact with the counter-contacts.

SUMMARY OF THE INVENTION

It is, therefore, suggested by the invention that the contact bridge be tiltably arranged on a pin within the case. In such an arrangement, the contact bridge can be locked on the pin by means of a simple locking ring. Moreover, an adequate bias can be generated by providing a spring between the contact bridge and the locking ring. Preferably, the contact bridge is made of a plate from which two contact tags are so bent that the closing edges of the tags slide on corresponding contact banks within the casing. The two contact banks, preferably, are arranged diametrically opposite the swivel axis and, preferably, are at an equal distance from the swivel axis.

In order to enable the contact bridge to be swiveled, two switch flaps are bent from the plate, the bending edges of which are approximately disposed on lines extending through the pivot. The switching flaps cooperate with cams on the driving rear wheel of the wiper gear. The switch flaps, preferably, are arranged on both sides of an imaginary line between the contact legs.

It is of advantage, especially with gear boxes made of plastic material, to locate the switch in or on the box bottom, with the contact banks to be contacted being guided in the bottom of the case and closing flush with the inner side of the case bottom. The contact banks, on one end, are guided through the motor flange into the motor and, on the other end, are guided in a plug housing arranged on the gear box. The pivot pin is integrally formed with the plastic box.

This arrangement involves the advantages that the contact bridge is easy to assemble and that the distances covered by the contacts during the operating life of a driving mechanism are reduced over those of conventional switches so that additional contact rivets can be eliminated.

BRIEF DESCRIPTION OF THE DRAWINGS

The invention will now be described with reference to two Figures in the drawing, wherein:

FIG. 1 shows a driving assembly, partly in section and partly as a plan view, with a park position switch and the associated shell; and FIG. 2 is a sectional view taken along the line II—II.

DESCRIPTION OF THE PREFERRED EMBODIMENT

FIG. 1 shows the cup-shaped box 1 of a gear of a driving mechanism on which, laterally, a motor flange 2 is integrally formed. Located in the cup-shaped box portion is a worm-gear 3 which is quasi transparent, thereby affording a free view to the bottom of the box. The worm-gear 3 is in communication with a driven shaft by which one or several wiper arms can be driven in an oscillating way. The anchor shaft 4 of an electromotor flanged thereto extends through the center of the flange 2, with a worm 5 being molded to the anchor shaft 4 to mesh with the toothing of the worm-gear 3.

The electromotor is a d.c. commutator motor provided with three brushes to which energy is supplied through contrast banks 10, 11, 12. As the motor is furnished with three brushes it can be operated in two speed phases I, II. To that effect, a first brush, through the contact bank 12, is permanently connected to the basic potential of the voltage supply. A second brush arranged diametrically opposite the first brush on the collector can be supplied with energy through another contact bank 11. In that case, the motor runs in speed phase I.

A third brush staggered over the second brush by a certain angle can be energized via a third contact bank 10. If energy is supplied to the motor through this brush, it runs in speed phase II, with the number of revolutions of the motor in speed phase I being lower than that in speed phase II.

FIG. 1 conveys that the contact banks 10, 11, 12 extend in the bottom of the case and are flush with the inner surface of the bottom.

In order to enable the contact blanks 10, 11, 12 to be directly arranged within the case it is, of course, necessary for the box to be made of plastic material. Otherwise a corresponding plastic board carrying the contact banks is to be placed on the bottom of the case.

One end of the contact banks 10, 11, 12 is respectively guided through the flange 2 into the interior of the motor where these ends are suitably connected to the brushes of the motor in an electrically conductive way. The illustration is highly schematical as the passage of the contact banks into the motor housing does not form a part of the invention. The same applies to the other ends of the contact banks which, laterally, are moved out of the case 1, possibly leading to a plug housing integrally formed with case 1. This feature has not been shown in any closer detail either as it does not form the actual subject of the invention.

The drive wipers generally involves the following problem. After the driver having switched off the wiper system, the motor is to be supplied with energy at least until the wipers are again in their park position at the bottom edge of the windscreen.

To achieve this, a so-called park position switch is mounted in the driving mechanisms for windscreen wipers, which is actuated by the driving mechanism itself in such a way that the driving motor is continued to be supplied with energy until the wipers have reached park position, even if the master switch to be operated by the driver is already in the "OFF" position.

In the present instance, the switch comprises a contact bridge 20 pivotally located above the case bottom. The electrically conductive bridge includes two contact tags 21, 22 with the one contact tag 21, irrespective of the angular position of the contact bridge, contacting a contact bank 13. The other contact tag 22, depending on the angular position of the contact bridge 20, either contacts bank 12 permanently in communication with the base potential of the supply voltage, or another bank 14 permanently connected to the positive potential of the supply voltage.

The contact bridge 20 will be operated (yet to be explained hereinafter) by means of two cams 30, 31 laterally protruding from the side face of the worm-gear 3 in the axial direction.

The driving mechanism is now supplied with energy via a master switch to be actuated by the driver. The master switch includes a switch bridge 41 able to accept three positions A, I and II. In position II, the switch bridge connects the positive pole of the voltage supply to the contact bank 10 so that the motor runs in speed phase II. In position I, the switch bridge 41 connects the contact bank 11 to the positive pole of the supply voltage so that the motor runs in speed phase I.

In position A, the switch bridge 41 connects the contact bank 11 to contact bank 13. Depending on the angular position of the contact bridge 20, a connection to the positive pole or to the base potential of the supply voltage has now been established. If there is a connection to the base potential—which applies only if the wipers are in their park positions—the motor is short-circuited and the wipers are non-actuated. If the contact bridge 20 is in a second position, in which the contact bank 14 is connected to the contact bank 13, voltage is supplied to the motor, i.e., it continues to run until the cam 30 on the worm-wheel 3 swivels the contact bridge 20 so that a connection is established between the contact bank 13 and the contact bank 12.

The contact bridge 20 is made of a plate of electrically conductive material which, in plan view, is approximately cross-shaped. Centrally of the longitudinal section 23 of the cross is a bore 24 through which is guided a pin 25 protruding from the bottom of case 1. The pin 25 forms the swivel axis of the contact bridge 20.

The ends of the longitudinal section 23 are bent off so that contact tags 21, 22 are formed, the connecting edges of which are in direct abutment with the contact banks 12, 13, 14. To that extent, contact rivets otherwise customary can be foregone as, due to the construction of the invention, the distances covered by the contacts, within the operating life of the driving mechanism are substantially reduced over conventional designs.

The bending edges of the flaps 21, 22 extend in a direction tangential to an imaginary circle about the swivel axis of the contact bridge 20.

The transverse section 26 of the cross-shaped contact bridge 20 is formed as a partial circle about the swivel axis, with the ends thereof being equally bent off, forming switch flaps 27, 28 cooperating with the cams 30, 31 on the worm-gear 3. The bent edges of the switch flaps 27, 28 extend approximately along an imaginary line through the swivel axis. The dimensions of the contact bridge 20 and the arrangement of the cams 30, 31 are such that the respective one cams 30, 31 when pushing away the appertaining switch flap 27, 28 so swivels the contact bridge 20 that the respective other switch flap 28, 27 is led into the path of movement of the respective other cams 31, 30 thereby reciprocating the contact bridge 20 once with each rotation of the worm-gear 3.

The contact bridge 20 is attached to the pin 25 by means of a locking ring 33. Located between the locking ring 33 and the contact bridge 20 is a helical spring 34 (or flexible spring) ensuring that the contact tags 21, 22 are forced onto the appertaining contact banks. As in this form of embodiment, the lever arms for the contact bridges, 21, 22 are equal in size, so that equal contact forces are generated.

To explain again the way of operation of the park position switch, it is assumed that the motor is operated in speed phase II. The worm-gear 3 rotates in the direction of arrow 35. The switch cam 31 has just forced the contact bridge 20 into the fully shown position, now passing along the switch flap 28. Now, if the master switch 40 is actuated by the driver and the switch bridge 41 placed into position A, the energy supply to the motor is through the current conducting path, i.e., the positive pole of the voltage supply, the contact bank 14, the contact bridge 20, the contact bank 13, the switch bridge 41 in position A and the contact bank 11. Hence, the motor is operated in switch phase I with the consequence that the worm-gear 3 further moves toward arrow 35 until the switch cam 30 gets into abutment with the switch flap 27 which is in its path of movement.

The afore-described position of the worm-wheel 3 corresponds to a position of the windscreen wiper shortly before its park position. In further rotation, the contact bridge 20, in FIG. 1, is swiveled in a clockwise direction until the contact tag 22 leaves the contact bank 14, thereby discontinuing the energy supply to the motor. Due to the energy of movement stored in the drive, the motor continues to run, thereby further swiveling the contact bridge 20 until the switch flap 22 gets into contact with bank 12 thereby causing a short-circuit at which the motor operates as generator and is quickly decelerated.

In the afore-described position, the switch cam 31 is directly ahead of the switch flap 28 shown in broken lines. Once current is again applied to the motor, the contact bridge 20 is restored so that, when the electromotor is switched off and the wipers are still in the swivel zone, and also after release of the master switch 40, energy can be supplied until the wipers have reached their park positions.

In conclusion, it should be noted that the park position switch of the invention also solves the problem encountered once the wipers cannot be placed to their parking position, for example, because snow has deposited on the windscreen which, in conventional switches, results in the wiper arms getting loaded when the engine continues to run. As soon as the engine is switched off by actuating the park position switch, the voltage stored in the wipers will cause the engine to restart so that energy is again supplied to the engine.

The afore-described situation will not occur with a park position switch of the type provided by the present invention because the cam 30, moving against the direction of the arrow 35, in that case, will only move away from the contact bridge without reswitching it.

To prevent the edge of the contact tag, which changes over from one contact bank to the other, from digging into the plastic material of the case, a slide insulated over the other contact banks can be provided between the two contact banks in the path of movement of the contact tag. If the distance between the slide and the contact banks is selected smaller than the longitudinal extension of the closing edge of the contact bank, it can be safeguarded that the same at least in part lies either on a contact bank or on the slide.

What is claimed is:

1. A driving mechanism having a gear wheel for a windscreen wiper with a park position switch having contacts fixed within one of a case and a lid thereof, and a contact bridge of the park position switch relatively displaceable in the case between two positions, with the contact bridge being displaceable via cams on the driving gear wheel of the driving mechanism, characterized in that the contact bridge is pivotally located on a pin defining a swivel axis and said pin eccentrically located from the gear wheel within one of the case and the lid thereof, and the contact bridge is integrally formed of an elongate plate with two contact tags bent from the plate to form contacts from the end edges.

2. The driving mechanism according to claim 1, characterized in that end edges arranged in approximately tangential relationship to an imaginary circle about the swivel axis.

3. The driving mechanism according to claim 2, wherein an imaginary line extending from one contact tag to the other contact tag defines a first side and a second side with the imaginary line disposed therebetween and characterized in that two switch flaps are bent from the contact bridge, with one of the switch flaps located in the first side and the other switch flap located in the second side.

4. The driving mechanism according to claim 3, characterized in that the pin is integrally formed with the case of the driving mechanism, and that contact banks to be contacted by the contact bridge extend in a bottom of the case flush with an inner surface of the case.

5. The driving mechanism according to claim 4, characterized in that the contact tags have end edges which directly superpose and are moveable into operably contact with the contact banks within the case through the swivel axis of the contact bridge.

6. The driving mechanism according to claim 5, characterized in that the contact bridge is locked by a locking ring on the pin, with a resilient element arranged in coaxial relationship to the pin between the locking ring and the contact bridge to drive the end edges of the contact bridge toward operable engagement with the contact banks.

7. In a driving mechanism having a gear wheel for a windscreen wiper with a park position switch having contacts fixed with respect to an inner surface of a case thereof, and a contact bridge of the park position switch rotatably displaceable in the case between two positions, with the contact bridge being displaceable via cams on the driving gear wheel of the driving mechanism, the improvement comprising:
    a pin integrally formed with the case of the driving mechanism, the pin eccentrically located with respect to the gear wheel within the case;
    the contact bridge pivotally located on the pin defining a swivel axis of the contact bridge, the contact bridge integrally formed of a single, monolithic plate having two contact tags bent to form contacts from the end edges of the monolithic plate defining a U-shaped cross-section, the end edges arranged in approximately tangential relationship to an imaginary circle about the swivel axis, the contact bridge locked by a locking ring on the pin with a resilient element arranged in coaxial relationship to the pin between the locking ring and the contact bridge to bias the contact bridge toward the inner surface of the case; and
    contact banks to be contacted by the contact bridge extending in a bottom of the case flush with an inner surface of the case, wherein the end edges of the contact tags are directly superposed and operably engageable with the contact banks within the case.

8. In a driving mechanism for a windscreen wiper with a park position switch having a box with a first inner surface and an open side, a lid with a second inner surface and securable to the box to close the open side, a gear wheel with a center axis and positioned within the box, the improvement comprising:
    a pin integrally molded to one of the box and lid positioned eccentrically to the axis of the gear wheel; and
    a contact bridge mountable on the pin, and formed of a single, monolithic metal plate with a plurality of contact tags bent to extend outwardly from the plate defining a U-shaped cross-section between opposite end edges of the plate, the end edges forming contacts.

9. A driving mechanism for a windscreen wiper with a park position switch comprising:
    an open ended enclosure having an aperture;
    a lid securable to an open end of the enclosure;
    a drive shaft penetrating the enclosure through the aperture, and having a shaft axis;
    a gear wheel having a center axis and cams, the gear wheel mountable to the drive shaft in the enclosure, such that the center axis is aligned with the shaft axis;
    a pin integrally mounted to one of the enclosure and the lid, such that a pin axis is located offset from the center axis; and
    a contact bridge mountable on the pin, and formed of a single, monolithic metal plate with a plurality of contact tags bent to extend outwardly from the plate defining a U-shaped cross-section between opposite end edges of the plate, the end edges forming contacts.

10. The driving mechanism of claim 9 further comprising a biasing element mounted on the pin and engageable with the contact bridge such that the biasing element urges the contact bridge in a direction parallel to the pin axis.

11. The driving mechanism of claim 10 wherein the pin is integrally mounted to the enclosure.

12. The driving mechanism of claim 11 further comprising a locking ring mountable to the pin, such that the biasing element is positioned between the locking ring and the contact bridge.

13. The driving mechanism of claim 12 wherein the biasing element is a coil spring.

14. A driving mechanism for a windscreen wiper with a park position switch comprising:
    a contact bridge formed by a single, monolithic metal plate with a plurality of switch flaps bent in a first direction and a plurality of contact flaps bent in a second direction, such that the first direction and second direction are substantially opposite from one another, the contact bridge mountable on a pin for rotational movement between two positions, and the plurality of switch flaps operably engageable with cams on a gear wheel for driving the contact bridge between the two positions.

* * * * *